June 29, 1937.  A. P. FERGUESON  2,085,213
TIRE COVER
Filed Sept. 8, 1932   3 Sheets-Sheet 1
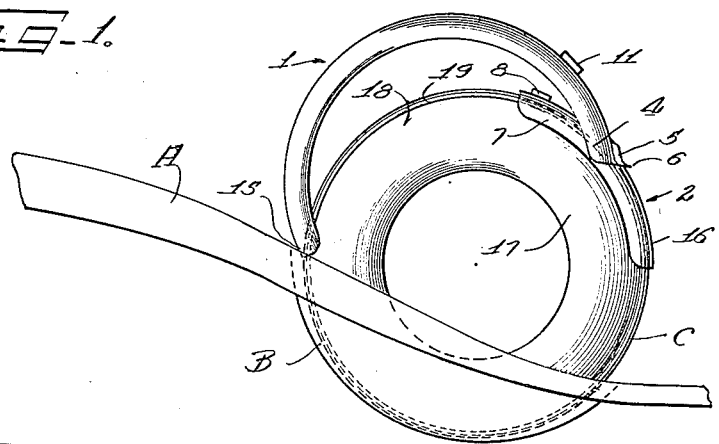
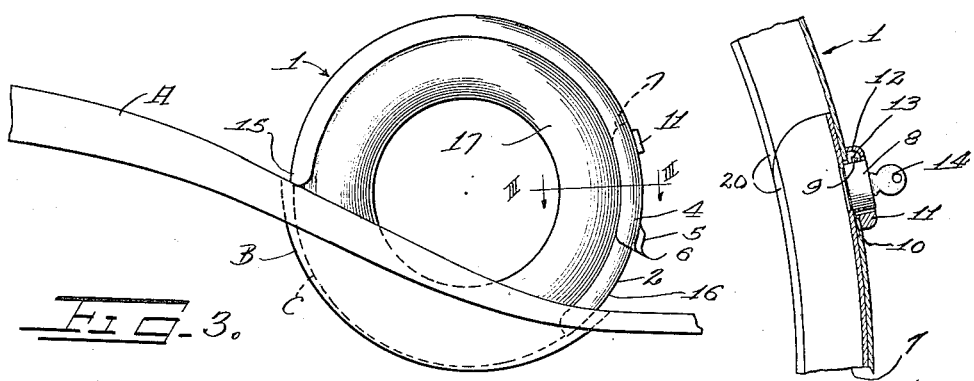
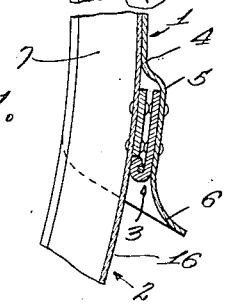
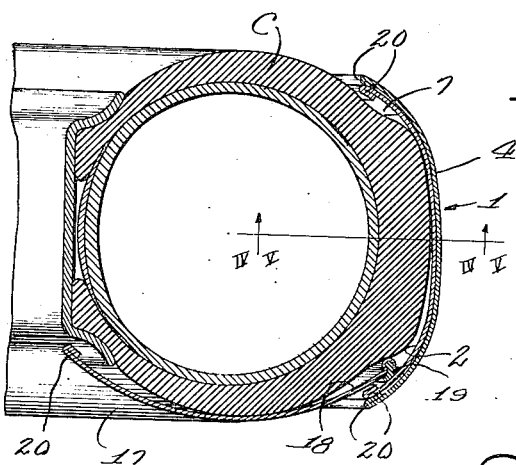
Inventor
Arthur P. Fergueson.
by Charles Hill
Attys.

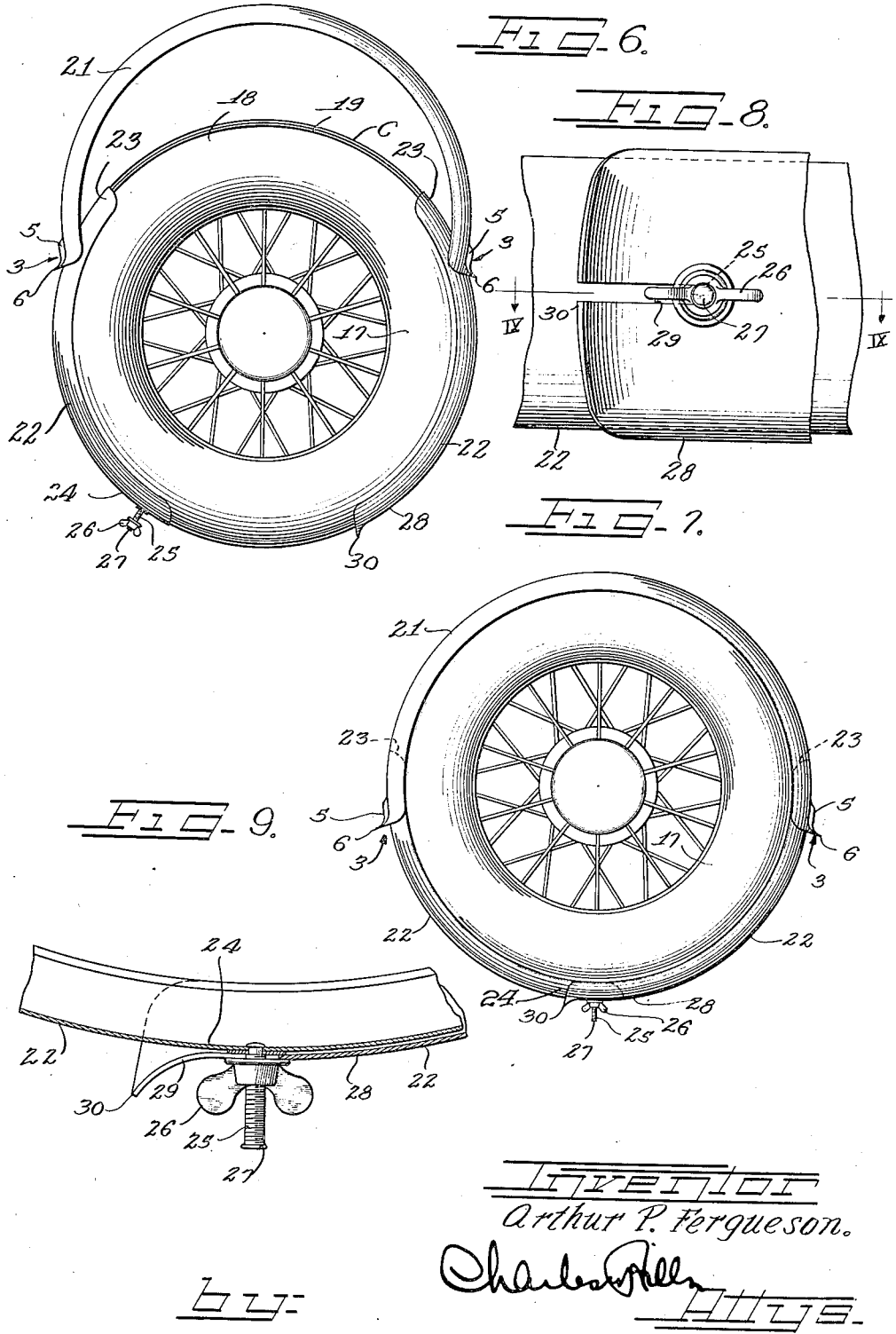

June 29, 1937. A. P. FERGUESON 2,085,213
TIRE COVER
Filed Sept. 8, 1932 3 Sheets-Sheet 3
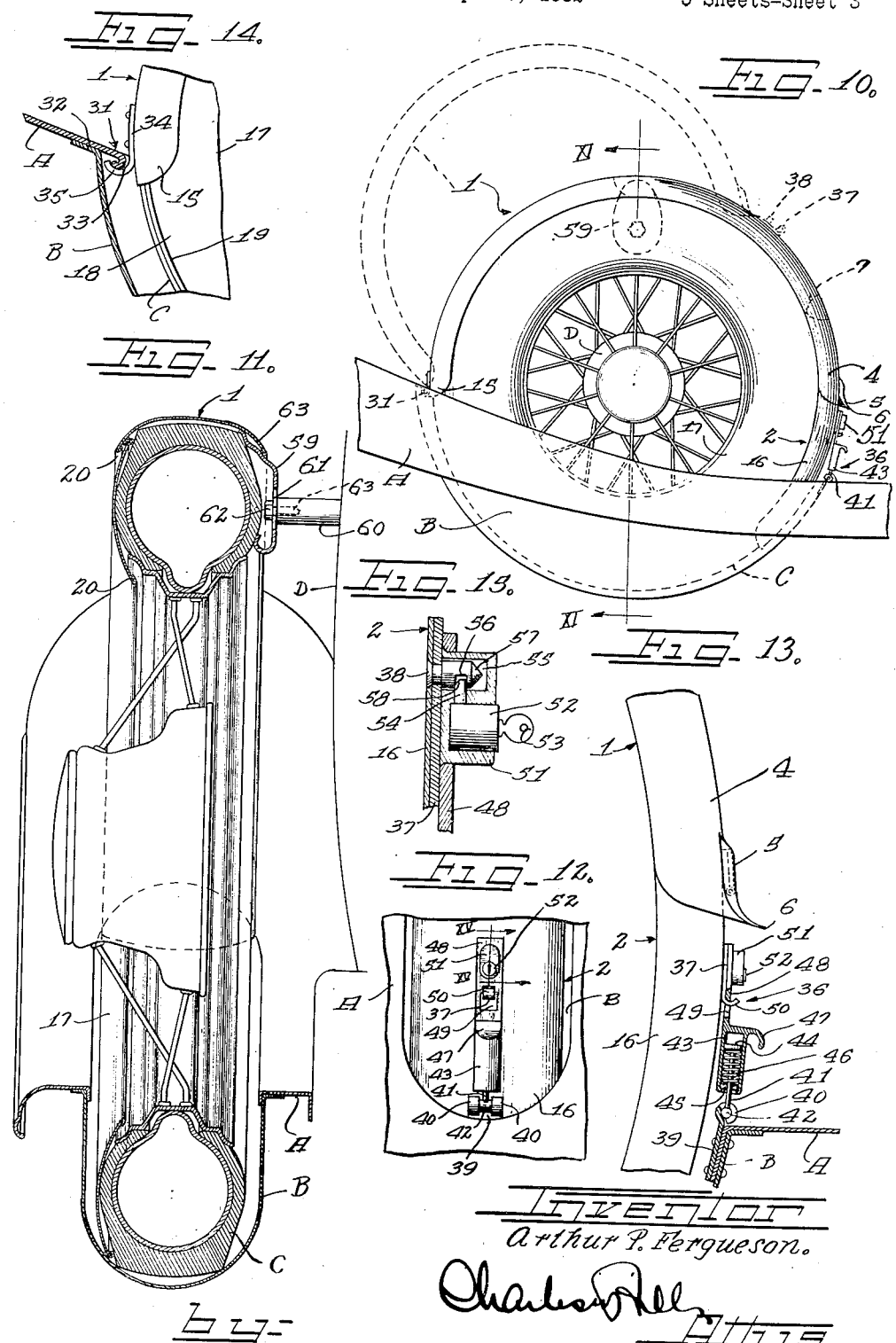
Inventor
Arthur P. Fergueson.
by Charles Hill
Attys.

Patented June 29, 1937

2,085,213

UNITED STATES PATENT OFFICE 2,085,213

TIRE COVER

Arthur P. Fergueson, Detroit, Mich., assignor to Lyon Cover Company, Detroit, Mich., a corporation of Michigan Application September 8, 1932, Serial No. 632,101

11 Claims. (Cl. 150—54)

This invention has to do with tire covers and is concerned more particularly with a spare tire cover of the sectional type.

One of the objections of this invention resides in the provision of a shove down tire cover such as a hood embodying a sectional tread covering member which may be employed alone or in cooperation with a side wall covering member or plate, capable of use with any spare tire, whether carried in a fenderwell or elsewhere.

A further object of the invention involves a tire cover comprising a plurality of sections, one of which serves to clamp itself and the other or others on the spare tire.

It is another object of the invention to provide a sectional tire cover, the sections of which are pivotally connected to each other.

A further object of the invention resides in the provision of a spare tire cover formed in sections arranged to be automatically interlocked when applied in tire covering position.

As another object of the invention, it is contemplated to provide a cover of the character above referred to which will adapt itself to tires of various sizes.

Another object of the invention consists in the provision of a tire cover arranged for cooperation with a fenderwell, together with means for locking the wheel or rim, tire and cover in the well, regardless of the size of the tire.

It is another object of the invention to provide means associated with the body of an automobile and cooperating with a fenderwell to hold a spare tire firmly in position in the well.

In accordance with the general features of the invention, the tire cover constructed in accordance herewith may take different forms. In one form, a resilient rim portion is substantially arcuate in form and of sufficient length to extend throughout more than 180° when in tire covering position. A second and shorter section, which may or may not be resilient, is pivoted intermediate its ends to one end of the first section and is of a curvature substantially corresponding to that of the tread of the spare tire to be covered. The parts are placed over the tread of the tire in substantially the median plane of the tread of the tire. The first section is then pressed or shoved onto the tread until it is in substantially intimate embracing relation thereto, the second section being in part overlapped and engaged by the adjacent end portion of the first section, said first section serving to hold both sections firmly above the tread. When used with a plate for covering the side wall of the tire, said plate is arranged to have a major portion of its outer edge overlapped by the sections of the cover.

The associated portions of the sections are provided with suitable lock means whereby the same may be interlocked automatically upon their coming together, as the first section is shoved into substantially intimate relation to the tread of the tire. They may be released by the use of any suitable key or like means.

In accordance with another form of the invention, more susceptible to use on a spare tire which is mounted, for example, at the rear of the car, a section similar to the first section above described is employed, in conjunction with preferably a plurality of additional arcuate sections arranged to conform substantially to the tread of the tire to be covered. The two latter sections are arranged for pivotal relation with the ends of the first section, and are further arranged to overlap each other and be clamped together at their free ends when all of the sections are in substantially intimate relation to the tread of the tire. Said free ends are arranged to be adjusted so that the sectional cover thus described is susceptible of being used in conjunction with spare tires of various sizes.

In accordance with a further form of the invention, the cover may be formed substantially identically with that first above described, provision being made for a detachable hinge relation between one end of the first section and one end of a fenderwell, and adjustable locking means associated with the opposite end of the well and with the adjacent portion of the second section for locking the wheel, tire and cover in position.

This construction affords a means for attaching and removing the tire cover with a minimum of effort, the cover itself being of simple construction involving a low cost of manufacture.

Further objects and advantages of the invention will appear as the description proceeds.

This invention (in a preferred form) is illustrated in the drawings and hereinafter more fully described.

On the drawings:

Figure 1 is a fragmentary elevational view of an automobile fenderwell and a tire and cover carried thereby, the cover being shown in unattached position.

Figure 2 is a view similar to Figure 1 but showing the tire cover in attached position.

Figure 3 is a fragmentary enlarged transverse section taken approximately in the plane indicated by the line III—III in Figure 2.

Figures 4 and 5 are enlarged fragmentary longitudinal sectional views taken approximately in the plane indicated by the line IV—V in Figure 3.

Figure 6 is an elevational view showing a modified form of cover in unattached relation to a spare tire.

Figure 7 is a view similar to Figure 6 but showing the cover in attached position.

Figure 8 is an enlarged fragmentary bottom view of Fig. 7.

Figure 9 is an enlarged fragmentary longitudinal sectional view taken approximately in the plane indicated by the line IX—IX in Figure 8.

Figure 10 is a fragmentary elevational view of an automobile fenderwell and a modified tire cover construction associated therewith.

Figure 11 is an enlarged transverse sectional view taken approximately in the plane indicated by the line XI—XI in Figure 10, a portion of the automobile body associated with the remaining structure also being shown.

Figure 12 is a fragmentary elevational view showing the details of the mechanism by which the cover is held in position relative to the fender in whose well the spare tire is carried.

Figure 13 is a fragmentary enlarged view, partly in section and partly in elevation, of the hold down device and associated structure at the right of Figure 10.

Figure 14 is a view similar to Figure 13 but showing the hinge connection between the fender and the adjacent end of the tire cover at the left of Figure 10.

Figure 15 is an enlarged fragmentary sectional view showing in detail the lock mechanism associated with the hold down means and taken approximately in the plane indicated by the line XV—XV in Figure 12.

As shown on the drawings:

Referring now more particularly to the drawings, one modification of the invention is shown in Figures 1 to 5 inclusive. The fender A is provided with a well B in which a spare tire C is carried. While the tire cover to be now described is shown in Figures 1 to 5 inclusive in connection with a fenderwell, it will be understood that its construction is such as to allow the same to be adapted for use in connection with any spare tire whether it be carried in a fenderwell, at the rear of a car or otherwise.

This illustrated embodiment of the invention comprises a resilient preferably metallic arcuate section 1 arranged to have an extent in excess of 180° when in proper tire protecting position as shown in Figure 2, and a second and preferably shorter section 2 which may or may not be resilient, is preferably of the same general transverse and longitudinal shape as the section 1, and preferably has a longitudinal curvature corresponding substantially to the longitudinal curvature of the spare tire C at its tread. The section or part 2 is preferably arranged so that it may conform to various sizes of tires carried in the fenderwell B, and if made resilient will adapt itself more readily to the various curvatures of spare tires.

The second section 2 is hinged intermediate its ends at 3 to one end 4 of the first section 1, said end 4 being formed with a bulged portion 5 for receiving the hinge hardware. The end 4 has its extremity 6 flared adjacent the bulge 5 to allow a substantial degree of relative angular movement between the sections 1 and 2, said extremity 6 serving as a stop to limit said movement. The section 2 nests within the section 1 at the hinge 3, and the portion 7 of the section 2 overlapped by the section 1 is adapted to nest therein as shown in Figures 2, 3, 4, and 5.

The portion 7 of the section 2 is provided adjacent its free end with a lock cylinder 8 including a key operated spring pressed or other plunger 9, and the first section 1 is provided with a corresponding opening 10 and housing 11, the latter having a recess 12 for receiving the plunger 9. The plunger 9 is preferably provided with a beveled face 13 which will automatically snap into the recess 12 when the sections are brought together from the relationship shown in Figure 1 to that shown in Figures 2, 3, 4, and 5. To release the plunger 9 from the recess 12, it is necessary merely to apply and manipulate the proper key 14.

When the cover is in position, the section 1 extends in excess of 180° about the tire C, and since its normal diameter is less than that of the tire at its tread, the section 1 tightly embraces the tire tread and consequently presses the section 2 inwardly, thereby functioning to resiliently resist removal from the tire. By this construction, it is obvious that the application of the cover to the tire is extremely simple since it is accomplished by substantially the one movement of forcing the section 1 in the direction of the center of the tire from the position shown in Figure 1 to the position shown in Figure 2. This requires essentially a pivotal movement of the section 1 about its free end 15, the section 2 sliding along the tread as the section 1 is pressed or forced toward the center of the tire. When the cover is in position as shown in Figure 2, the resistance which the section 1 alone offers to removal from the tire is augmented by the portion 16 of the section 2 projecting beyond the end 4 of the section 1. This additional resistance offered by the portion 16 continues as long as desired, and yet is, for the most part, if not entirely, absent as soon as the spring pressed plunger 9 is retracted by the key 14, so that intentional removal of the sections 1 and 2 from the tire C is facilitated.

It will be understood that the cover comprising the sections 1 and 2 may be made in a length sufficient to cover the exposed tread portions of a spare tire carried in a fenderwell B as shown, or may be made in a greater length for use in connection with a spare tire mounted at the rear of the automobile or elsewhere.

The cover comprising the sections 1 and 2 may constitute the sole tire covering means, or, if desired, a side plate 17 may be used in conjunction therewith. The plate 17 is preferably employed to cover the outer side wall of the tire C and is of such dimensions as to be overlapped at its outer peripheral portion 18 by the adjacent margins of the parts 1 and 2. The plate 17 is preferably provided with a rubber or like cushioning bead 19 which is engaged by the adjacent marginal portions of the parts 1 and 2 and thereby prevents metal to metal contact between the tread covering parts and the side plate 17. For the purpose of providing smooth edges as well as to reinforce the margins of the parts 1, 2, and 17, said margins are return bent as shown at 20.

It is clear from the foregoing that the tire cover just described may be applied to a tire after the tire is mounted upon its carrier, either in a fenderwell or otherwise. When the side plate is used in conjunction with the tread covering portion, in the case of a fenderwell mounting, the side plate is placed adjacent the side wall of the tire at one end of the well and is rolled into the well. The tread covering portion or member is then applied as above described, allowing one marginal portion thereof to overlap the portion 18 of the side plate 17 as above explained. When used in connection with a spare tire carried at the rear or anywhere in the absence of a well, the side plate may be held against the outer wall of the tire with one hand while the tread covering member is applied with the other in the manner above described.

In the form of the invention illustrated in Figures 6, 7, 8 and 9 substantially the same principle governing the modification appearing in Figures 1 to 5 inclusive is employed, the cover being so designed, however, that it will completely encircle the tread portion of the tire. This construction has a desirable appearance and is applicable to rear mounted spare tires or spare tires mounted on the side and not entering a fender or other well.

In this form, the side plate 17 is preferably used. The tread covering portion or member comprises a tension member 21 which resembles the section 1 and includes a pair of sections 22 corresponding with the single section 2 of the form of the invention illustrated in Figures 1 to 5 inclusive. The sections 22 are hinged to the tension section or part 21 at 3 by a construction which is identical with that appearing in Fig. 5, the adjacent end portions of the sections 21 being identical with that appearing at 5 and 6 in the above described form of the invention. The description of this construction is accordingly not repeated. The tension section 21, like the above described tension section 1, is resilient and has a normal diameter which is less than the diameter of the spare tire C at its tread, and is moreover of such a length that, when arranged in proper tire protecting position as shown in Figure 7, it subtends an angle in excess of 180°, thereby tightly embracing the tread of the tire and resiliently resisting its removal from this position. Each of the sections 22 is formed in the shape of an arc having a radius of curvature substantially equal to or approximating that of the tread of the tire C, and may be made resilient in order to adapt itself readily to tires of different tread diameters. The pivotal connection 3 between each section 22 and the section 21 is preferably arranged adjacent the overlapped end 23 of the section 22, the shape of each section 22, transversely, conforming to that of the section 21 so that when the cover is in proper tire protecting position as shown in Fig. 6, the ends 23 nest within the adjacent end portions of the section 21 as shown in Figure 7 and also in enlarged cross section in Figure 3.

Each section 22 is of such length that when arranged as shown in Figure 7, the entire tread covering portion consisting of the sections 21 and 22 embraces in excess of 360°, the free ends of the sections 22 overlapping as shown in Figures 7, 8, and 9. The free end 24 of one of the sections 22 carries a threaded stud 25 which is preferably permanently fastened thereto, a wing nut 26 being applied to the stud. The stud 25 is preferably enlarged at its free end 27 to prevent separation of the nut 26 therefrom. The cooperating end 28 of the other section 22 is formed with a substantially centrally located slot 29 for receiving the stud 25, the length of the slot 29 being sufficient to allow the ends 24 and 28 to be placed in proper relation to each other before the nut 26 is rotated to clamp the ends 24 and 28 together.

The extremity 30 of the end 28 is curved away from the center of the cover in a manner corresponding with the extremities 6 of the tension member 21 to continue the ornamental scheme of the cover, and serves the useful function of providing an abutment for preventing accidental separation of the ends 22 and 24, should the nut 26 become loose. The flaring of the end 30 performs the additional function of allowing the ends 24 and 28 to automatically overlap upon their coming together as the tread covering member is applied into covering relation to the tire. Once the nut 26 is tightened in position, rattling between the parts is prevented.

The method of applying the tri-sectional tread covering part resembles that used in connection with the previously described form of tread covering member. It involves the arrangement of the parts 21 and 22 in the median plane of the tire with the ends 24 and 28 spaced apart a distance equal to or slightly in excess of the diameter of the tread of the tire. The tread covering member is thereupon moved in its own plane toward the tire, the center of the tension section 1 moving in an imaginary line connecting the same with the center of the tire. As this movement is continued, the ends 23 engage the tire C and act as pivots about which the remaining portions of the sections 22 swing until the parts are arranged as shown in Figure 6. As the section 21 is thereafter continued in its movement toward the center of the tire, the ends of 30 said section are cammed outward by the tire and then move beyond the diametrically opposite lateral tire tread portions and thence somewhat toward each other to occupy the positions shown in Figure 7. During this latter movement, the sections 22 are held adjacent the tread of the tire by virtue of the spring pressure of the section 21, and as the ends 24 and 28 come together, the flared extremity 30 allows the end 28 to slide over the end 24, the stud 25 slipping into the slot 29 of the end 28. The nut 26 is thereupon tightened to hold the parts against rattling.

In the event the side plate 17 is also used, the latter is easily placed against the outer side wall C and held there until the parts are positioned as shown in Figure 6, after which the plate 17 may be released since the parts of the tread covering member will hold the side plate in place without assistance.

A still further modified tire cover construction is shown in Figures 10 to 15 inclusive. In this form of the invention, the tread covering member is for the most part identical with that appearing in Figures 1 to 5 inclusive, and accordingly the identical parts are like numbered. In the form of the invention shown in Figures 10 to 15 inclusive, the free end 15 of the tension section 1 is detachably hinged at 31 adjacent the forward end 32 of the well B. To this end, the fender A overlies the forward end of the well B and is curled at 33. A substantially J-shaped bracket 34 is applied to the end 15 of the section 1 by riveting or any other suitable means, the hook 35 thereof having sliding pivotal engagement with the curled portion 33, but being freely separable therefrom when the section 1 is turned in a counterclockwise direction as viewed in Fig. 14. It will be appreciated that, if desired, a permanent hinge connection between the fender A and the section 1 could be provided.

In place of the locking instrumentalities of the form of the invention appearing in Figures 1 to 5 inclusive, a different securing and locking mechanism designated generally by the numeral 36 is provided in connection with the form of the invention now being described. The portion 16 of the section 2 projecting beyond the section 1 carries a substantially J-shaped bracket 37 and is also provided with a stud 38 projecting outwardly therefrom as shown in Figure 15. The purpose of the stud 38 will appear as the description proceeds.

Secured adjacent the rear end of the fenderwell B is a bracket 39 whose upper end is bifurcated to provide spaced arms 40 which are curled to form coaxial eyes. A rod 41 has at its lower end a head 42 which is pivotally received in the eyes 40, the rod 41 swinging in the space between the eyes. The rod 41 extends into a cylinder 43 and is provided at its upper end with a piston or head 44 which is slidable in the cylinder. At the lower end of the cylinder 43 is provided a ring or washer-like bearing 45 for the rod 41, and a spring 46 is compressed between the head 44 and the ring 45 and constantly acts to move the head 44 deeper into the cylinder 43. The cylinder 43 carries a hook 47 by means of which the cylinder may be pulled upward against the action of the spring 46, and is further provided with an upward extension 48 having an opening 49 for receiving the hook 50 of the bracket 37.

A lock housing 51 is secured to the extension 48 and carries a lock cylinder 52 adapted to be operated by a proper key 53. The lock cylinder 52 is provided with a plunger 54 which may be spring pressed if desired and with a recess or hole 55 for receiving the stud 38. The stud 38 is provided with a notch 56 for receiving the plunger 54. The outer end 57 of the stud 38 is preferably substantially cone-shaped to facilitate its entry into the recess 55, and the corner of the plunger 54 facing the tire is also beveled at 58 for a like purpose.

The tread covering parts 1 and 2 are placed in proper position as shown in full lines in Figure 10 in substantially the same way in which the corresponding parts of Figures 1 to 5, inclusive, are assembled with the tire C, with the exception that the end 15 of the section 1 in Figure 9 et seq. is first hooked about the fender A at the forward end of the well B as shown in detail in Figure 14 and in dotted lines in Figure 10, the side plate 17, if employed, being placed in position in exactly the same manner in which the side plate 17 of the form illustrated in Figures 1 to 5, inclusive, is placed in position. With the parts 1 and 2 in proper embracing relation to the tire tread as shown in Figure 10, the finger grip 47 is engaged and the cylinder 43 raised a sufficient degree to allow the hook 50 to pass through the opening 49 in the extension 48. The grip 47 is thereupon released and the hook 50 thus serves as a support for the cylinder 43 and its extension 48. The locking instrumentalities are so arranged that when the extension 48 is supported by the hook 50, the stud 38 is in substantially axial alignment with the hole 55 in the lock housing 51, and may partially project thereinto. By placing the hand against the lock housing 51 and forcing the same toward the section 2, the stud 38 is caused to completely enter the hole 55 and the plunger 54 is allowed to snap into the notch 56, thereby locking the wheel or rim, as the case may be, tire C and cover in the fenderwell B.

With this construction, the tread covering parts 1 and 2 are held against rattling by reason of the spring 46, and the same cover may be employed in connection with treads of different diameters, the spring 46 providing for proper adjustment in this respect. If desired, the hinge connection 31 could be employed at the rear end of the fenderwell B and the locking instrumentalities 36 employed at the forward end of the fenderwell B. By retracting the plunger 54 by using the proper key 53, pulling the cylinder 43 away from the section 2 until the stud 38 is retracted from the lock housing 51, and raising the cylinder 43 until the extension 48 is clear of the hook 50, the sections 1 and 2 may be readily removed from the cover since it is then only necessary to overcome the spring pressure of the tension section 1 as in the previously described forms of the invention.

It will be seen from the foregoing that the tread covering member comprising the sections 1 and 2 may be applied in a single operation as heretofore, and that the locking of the same in position requires merely one other operation, namely, that of swinging the cylinder 43 up onto the hook 50 and closing the lock housing 51 about the stud 38. By executing these operations in reverse order, the cover may be removed. If desired, the stud 38 and lock instrumentalities may be dispensed with, the hook connection between the bracket 37 and extension 48 serving the purpose of holding the parts in position, and the spring providing for proper adjustment to accommodate tires of different tread diameters.

In order to steady the tire and cover carried in the well B, an adjustable stamping 59 engageable with the inner side wall and, if desired, a portion of the tread of the tire C may be employed. The stamping 59 is preferably adjustably mounted on a bracket 60 carried by the car body D and this construction may be similar to that employed in hold-down clamps for fenderwell mounted spare tires. The stamping 59 is provided with a vertical slot 61 through which a screw 62 passes into threaded engagement with the bracket 60 at 63. The screw 62 serves to clamp the stamping 59 in the desired position of vertical adjustment, so that the same may be positioned to properly engage tires of different sizes. The stamping is arranged so that when it is in proper engagement with the tire C, the tension section 1 overlies the same as shown at 63.

The form of the invention just described, while shown in cooperative relation to a fender and fenderwell of a car, could nevertheless be employed in connection with a spare tire mounting in which no well is employed, in which event the hinge means at 31 and the hold-down lock means designated generally by the numeral 36 would be applied to brackets preferably permanently secured at appropriate points to the body of the car. In such an event, the stamping 59 could be dispensed with.

The tire cover parts are preferably made of sheet metal, although other material having the desired properties of stiffness and flexibility may be used.

It will be observed that the extremities 6 have the further function of providing means by which the cover may be grasped by the hands to facilitate spreading of the ends of the sections 1 and 21 to thereby facilitate removal thereof from the tire.

The sections 2 and 22 serve as shoes which are slidable along the tire tread as the cover is being applied to the tire, thereby making it possible to place the cover in position with a single, simple movement, and also constitute levers which have a crowbar action in spreading the ends of the sections 1 and 21 when it is desired to remove the cover from the tire. If desired, hand grips could be applied to the sections 2 and 22 to facilitate their use as levers.

In the form of the invention illustrated in Figures 1 to 5, once the sections 1 and 2 are interlocked, they constitute in effect a single rigid body which embraces a substantially greater peripheral portion of the tread and thus considerably augments the ability of the cover to hold itself on the tire and oppose removal thereof. Once the lock is released, only the resistance offered by the section 1 need be overcome.

If desired, a side plate for covering not only the outer side wall of the spare tire, but in addition the entire outer side of the spare wheel including its hub, may be employed in conjunction with the tread covering structure of any of the above described forms. With such a side plate, when the tread covering means is locked as to a fender well, removal of the spare tire will be effectively prevented since access to the tire mounting means will be prevented.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A tire cover comprising mutually hinged arcuate tread covering sections, one of said sections being resilient and of such length that it subtends an angle in excess of 180° when in proper tread covering position, and having a normal diameter substantially less than the diameter of the tread of the spare tire, to thereby hug the tread of the tire, the other section being arranged to nest in the first section and including a portion extending beyond said first section whereby said first section partly overlies and holds the second section in tight engagement with the adjacent portion of the tread of the tire.

2. A shove-down cover for a spare tire, said cover comprising an expansible and contractible arcuate section subtending an angle in excess of 180° when in proper tire protecting position, a second arcuate section pivoted intermediate its ends to the first section, the portion of the second section on one side of the pivot being arranged to nest within the adjacent portion of the first section, a fender having a well in which the spare tire is carried, one end of the first section being disposed at the mouth of the well adjacent one end thereof, and the other portion of the second section being arranged at the mouth of the well at the other end thereof.

3. A shove-down cover for a spare tire, said cover comprising an expansible and contractible arcuate section subtending an angle in excess of 180° when in proper tire protecting position, a second arcuate section pivoted intermediate its ends to the first section, the portion of the second section on one side of the pivot being arranged to nest within the adjacent portion of the first section, a fender having a well in which the spare tire is carried, one end of the first section being disposed at the mouth of the well adjacent one end thereof, the other portion of the second section being arranged in the mouth of the well at the other end thereof.

4. A tire cover comprising mutually hinged tread covering sections, one of said sections being expansible and contractible and having a normal diameter which is less than that of the tread, and of such length that it subtends an angle in excess of 180° when in proper tread covering position and the other section having an end which is overlapped by the first section, whereby, upon swinging said other section about said end, the ends of the first section will be separated and the cover readily removed from the tire.

5. A tire cover comprising mutually hinged tread covering sections, one of said sections being resilient and formed to hug the tread and being of such length that it subtends an angle in excess of 180° when in proper tread covering position, the other section having an end which is overlapped by the first section, whereby, upon swinging the other section about said end as a center, the ends of the first section will be separated and the cover readily removed from the tire, and means for automatically locking said sections together as a rigid body as they assume their proper tread covering positions.

6. A tire cover construction comprising mutually hinged tread covering hood sections, one of said sections being resilient and formed to hug the tread and being of such length that it subtends an angle in excess of 180° when in proper tread covering position, a tire support section having a well for carrying the tire, means affording a hinge connection between the support section and the first section, and a yieldable hold-down device for connecting the support section with the other section.

7. A tire cover construction comprising mutually hinged tread covering hood sections, one of said sections being resilient and formed to hug the tread and being of such length that it subtends an angle in excess of 180° when in proper tread covering position, a tire support section having a well for carrying the tire, and hold-down devices operatively associated with the support and hood sections, one of said devices including a member contractible and expansible in a direction substantially parallel circumferentially to the tire tread, whereby to accommodate the cover construction to tires of various tread diameters.

8. A shove-down cover comprising a resilient section formed to hug a tire and embrace a major peripheral portion thereof, and a second section hinged intermediate its ends to and under the first section and serving as a shoe which slides along and is clamped against the tire tread as the first section is shoved onto the tire, said second section serving also as a lever swingable about one end for forcing the first section off the tire.

9. A shove-down cover comprising a resilient section formed to hug a tire and embrace a major peripheral portion thereof, a second section hinged intermediate its ends to and under the first section and serving as a shoe which slides along and is clamped against the tire tread as the first section is shoved onto the tire, said second section serving also as a lever swingable about one end for forcing the first section off the tire, and means for locking said sections together as a single rigid member when the cover is in proper protecting relation to the tire.

10. A spare tire cover construction including a tire support having a well, a tire hood hinged at one end to the mouth of the well, an arm carried by another part of the well, and releasable self-interlocking means carried by said arm and the adjacent portion of said hood, said arm being resiliently expansible and contractible whereby the same may be adjusted for tires of different sizes to bring said means into proper alignment for interlocking, and means for relieving the first means from the strain tending to normalize said arm.

11. A spare tire cover construction including a tire support having a well, a tire hood hinged at one end to the mouth of the well, an arm carried by another part of the well, and releasable self-interlocking means carried by said arm and the adjacent portion of said hood, said arm being resiliently expansible and contractible whereby the same may be adjusted for tires of different sizes to bring said means into proper alignment for interlocking, means for relieving the first means from the strain tending to normalize said arm, and a grip associated with said arm to facilitate manipulation thereof.

ARTHUR P. FERGUESON.